(12) United States Patent
Kimura

(10) Patent No.: US 8,274,260 B2
(45) Date of Patent: Sep. 25, 2012

(54) BATTERY PACK

(75) Inventor: Tadao Kimura, Kobe (JP)

(73) Assignee: Panasonic Corporation, Osaka (JP)

( * ) Notice: Subject to any disclaimer, the term of this patent is extended or adjusted under 35 U.S.C. 154(b) by 603 days.

(21) Appl. No.: 11/299,825

(22) Filed: Dec. 13, 2005

(65) Prior Publication Data

US 2006/0158151 A1    Jul. 20, 2006

(30) Foreign Application Priority Data

Dec. 13, 2004   (JP) ................................ 2004-359988

(51) Int. Cl.
   *H02J 7/00* (2006.01)

(52) U.S. Cl. ........ 320/132; 320/134; 320/136; 320/153; 320/162; 324/427; 324/431; 324/434

(58) Field of Classification Search .................. 320/132, 320/134, 136, 153, 162; 324/427, 431, 434
   See application file for complete search history.

(56) References Cited

U.S. PATENT DOCUMENTS

| | | | | |
|---|---|---|---|---|
| 4,803,417 A | * | 2/1989 | Nowakowski et al. | 320/136 |
| 5,287,053 A | * | 2/1994 | Hutchinson | 320/125 |
| 5,341,084 A | * | 8/1994 | Gotoh et al. | 324/427 |
| 5,530,336 A | * | 6/1996 | Eguchi et al. | 320/118 |
| 5,614,804 A | * | 3/1997 | Kayano et al. | 320/134 |
| 5,648,713 A | * | 7/1997 | Mangez | 320/103 |
| 5,796,239 A | * | 8/1998 | van Phuoc et al. | 320/107 |
| 5,936,314 A | * | 8/1999 | Suganuma et al. | 307/10.1 |
| 6,091,246 A | * | 7/2000 | Saigo et al. | 324/434 |
| 6,313,606 B1 | * | 11/2001 | Eguchi | 320/132 |
| 6,388,426 B1 | | 5/2002 | Yokoo et al. | |
| 6,882,129 B2 | * | 4/2005 | Boskovitch et al. | 320/119 |
| 2002/0105303 A1 | | 8/2002 | Kishi et al. | |
| 2002/0145402 A1 | | 10/2002 | Ueda et al. | |
| 2003/0193318 A1 | | 10/2003 | Ozawa et al. | |

(Continued)

FOREIGN PATENT DOCUMENTS

EP    0 546 569    6/1993

(Continued)

OTHER PUBLICATIONS

Japanese Office Action, with English translation, issued in Japanese Patent Application No. 2004-359988, mailed Feb. 1, 2011.

*Primary Examiner* — Edward Tso
*Assistant Examiner* — Johali Torres Ruiz
(74) *Attorney, Agent, or Firm* — McDermott Will & Emery LLP

(57) ABSTRACT

A battery pack is provided which includes: a state detection section which decides whether secondary batteries are in an electricity-charged state or in an electricity-discharging state; a power decision section which decides whether the secondary batteries are in a power-on state or in a power-off state; and a residual-capacity calculation section which, if the state detection section decides that they are in the electricity-charged state, calculates the residual capacity of the secondary batteries by accumulating a current value detected by a current sensor, and if the state detection section decides that they are in the electricity-discharging state, calculates the residual capacity of the secondary batteries by acquiring the voltage of the secondary batteries when the power decision section decides that they are in the power-off state.

11 Claims, 5 Drawing Sheets

U.S. PATENT DOCUMENTS

2004/0239293 A1* 12/2004 Mori et al. .................... 320/132

FOREIGN PATENT DOCUMENTS

| | | |
|---|---|---|
| EP | 1 338 461 | 8/2003 |
| JP | 11162524 | 6/1999 |
| JP | 11-317246 | 11/1999 |
| JP | 2002-286818 | 10/2002 |
| JP | 2002-315218 | 10/2002 |
| JP | 2003257501 | 9/2003 |
| JP | 2004-222433 | 8/2004 |
| JP | 2004-251744 | 9/2004 |
| WO | WO 98/56059 | 12/1998 |

* cited by examiner

BATTERY PACK

BACKGROUND OF THE INVENTION AND RELATED ART STATEMENT

1. Field of the Invention

The present invention relates to a battery pack which detects the residual capacity of a secondary battery.

2. Description of the Related Art

In recent years, a high-performance secondary battery has been developed which can supply an electric current of 100 A or above even at a capacity of several ampere-hours. Such a secondary battery has been noticed as the power source of an apparatus which bears a heavy load and is also subjected to considerable variations in the load, such as an electric tool, an electrically-driven bicycle and a hybrid electric vehicle. Besides, this secondary battery is frequently used at a great electric current. Therefore, it is essential to detect its residual capacity so that the secondary battery can be prevented from being damaged and its safety can be secured.

As the method of detecting the residual capacity of a secondary battery, a current accumulation method and a voltage monitoring method have been known. The current accumulation method is a method in which the electric current which flows through a secondary battery is accumulated so that its residual capacity can be calculated. On the other hand, the voltage monitoring method is a method where the voltage of a secondary battery is measured, and based on the measured voltage, the residual capacity can be calculated.

The current accumulation method has an advantage in that even if the load varies largely, the residual capacity can be detected more precisely than the voltage monitoring method.

In contrast, the voltage monitoring method is advantageous in that even if the load varies slightly, the residual capacity can be detected more accurately than the current accumulation method.

In general, therefore, if a load apparatus whose load is not varied greatly is connected to a secondary battery, its residual capacity can be detected by the voltage monitoring method. On the other hand, if a load apparatus whose load is largely varied is connected to a secondary battery, the residual capacity can be detected by the current accumulation method.

Furthermore, in WO No. 98/56059 specification, a battery pack is proposed in which the method is switched from the current accumulation method to the voltage monitoring method, and vice versa, according to an electric current. Specifically, the electric current which passes through a secondary battery is measured, and if the measured electric current is large, the residual capacity is calculated by the current accumulation method. In contrast, if the measured electric current is not large, the residual capacity is calculated by the voltage monitoring method.

However, in the battery pack according to WO No. 98/56059 specification, the current accumulation method is used when the electric current is large. But if the above described apparatus which requires a great electric current, such as an electric tool, is connected to this battery pack, then the battery pack needs to be formed by a current sensor which can detect a large electric current. Such a great-current detectable current sensor is generally expensive, thus raising costs for a battery pack.

SUMMARY OF THE INVENTION

It is an object of the present invention to provide a battery pack which is capable to precisely calculating the residual capacity of a secondary battery, without using a current sensor which can detect a large electric current, even though a load apparatus which requires a great electric current and also undergoes considerable variations in its load is connected to this battery pack.

A battery pack according to the present invention, comprising: a secondary battery; a voltage detecting means for detecting the voltage of the secondary battery; a current detecting means for detecting an electric current which passes through the secondary battery; a state detecting means for detecting whether the secondary battery is in an electricity-charged state or an electricity-discharging state; a receiving means for receiving, from a load apparatus which is connected to the battery pack, a power notification signal for notifying the battery pack whether the power is turned on or off; and a residual-capacity calculating means for, if the secondary battery is detected being in an electricity-charged state by the state detecting means, then calculating the residual capacity of the secondary battery by accumulating the electric current which is detected by the current detecting means, and if the secondary battery is detected being in an electricity-discharging state by the state detecting means, then calculating the residual capacity of the secondary battery based on the voltage which is detected by the voltage detecting means when the power notification signal indicates that the power is turned off.

A battery pack according to the present invention which is connected to an electricity-charging apparatus which charges a secondary battery and a load apparatus which discharges the secondary battery, wherein: the electricity-charging apparatus includes a current detecting means for detecting an electric current which passes through the secondary battery, and a transmitting means for transmitting, to the battery pack, the value of the electric current which is detected by the current detecting means; and the battery pack includes: a voltage detecting means for detecting the voltage of the secondary battery; a state detecting means for detecting whether the secondary battery is in an electricity-charged state or an electricity-discharging state; a receiving means for receiving, from the load apparatus, a power notification signal for notifying the battery pack whether the power is turned on or off; and a residual-capacity calculating means for, if the secondary battery is detected being in an electricity-charged state by the state detecting means, then calculating the residual capacity of the secondary battery by accumulating the value of the electric current which is transmitted by the transmitting means, and if the secondary battery is detected being in an electricity-discharging state by the state detecting means, then calculating the residual capacity of the secondary battery based on the voltage which is detected by the voltage detecting means when the power notification signal indicates that the power is turned off.

According to these configurations, in an electricity-charged state, the electric current passing through a secondary battery is accumulated, so that the secondary battery's residual capacity is calculated. On the other hand, if the secondary battery is in an electricity-discharging state, the secondary battery's residual capacity is calculated based on the secondary battery's voltage when the power is turned off. Herein, in general, a secondary battery is charged using an electric current at a relatively low level. Hence, there is no need to use a current sensor which can detect a high-level electric current. A battery pack or an electricity-charging apparatus can be formed by an inexpensive current sensor which can detect the electric current that passes through the secondary battery when charged, or an electric current at such a level. This helps cut down costs for a battery pack or an electricity-charging apparatus. On the other hand, at the time of a discharge, the residual capacity is calculated based on the voltage when the power is turned off. In other words, when the variation in the load is large with the power turned on, the residual capacity is not supposed to be calculated. This makes it possible to calculate the residual capacity precisely.

These and other objects, features and advantages of the present invention will become more apparent upon reading of the following detailed description along with the accompanied drawings.

DETAILED DESCRIPTION OF THE PREFERRED EMBODIMENTS OF THE INVNETION

The invention is now described, by way of examples, with reference to the accompanying drawings.

(First Embodiment)

Figure 1:
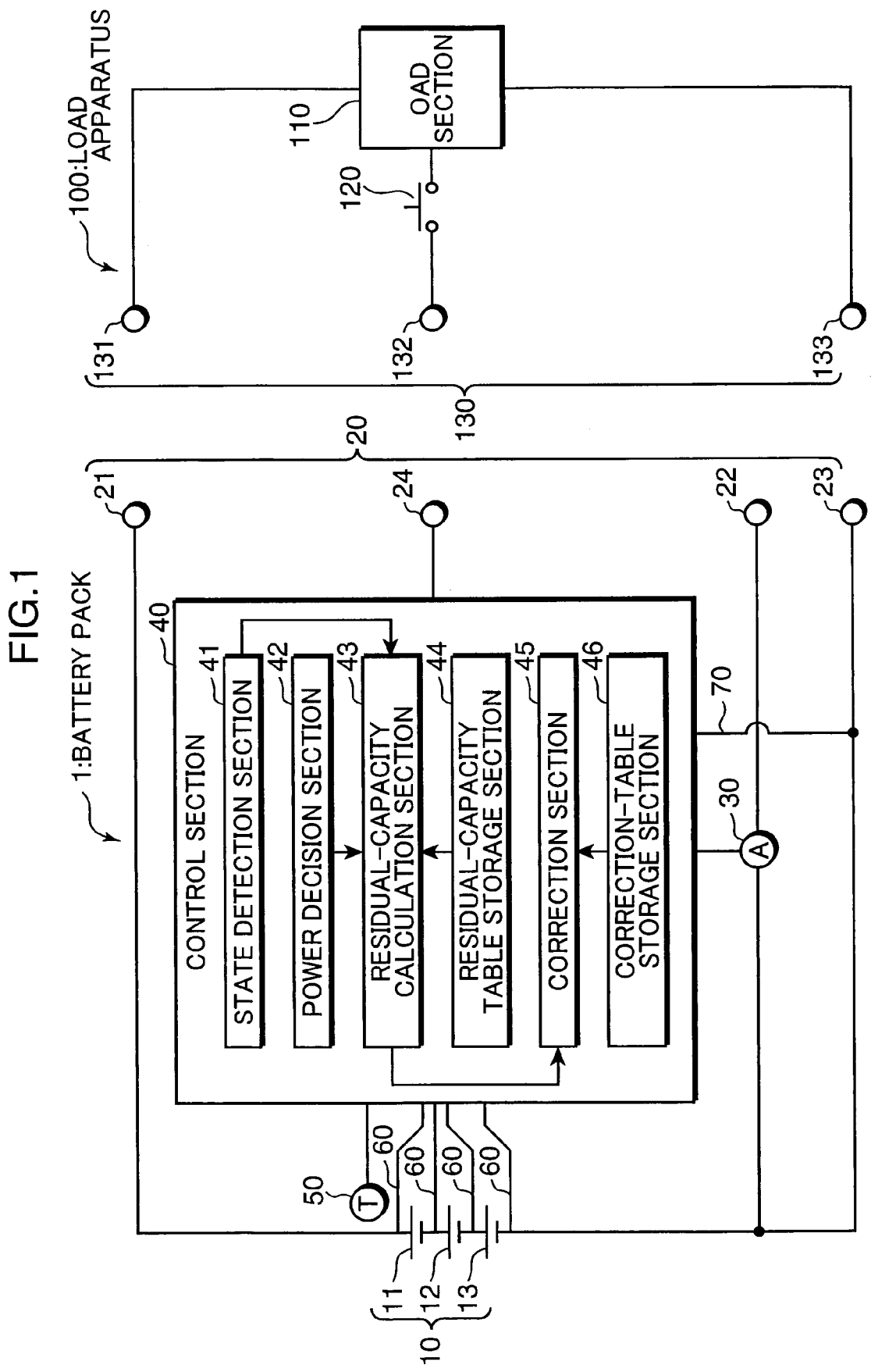
FIG. 1 is a block diagram, showing a battery pack according to a first embodiment of the present invention which is connected to a load apparatus.
Figure 2:
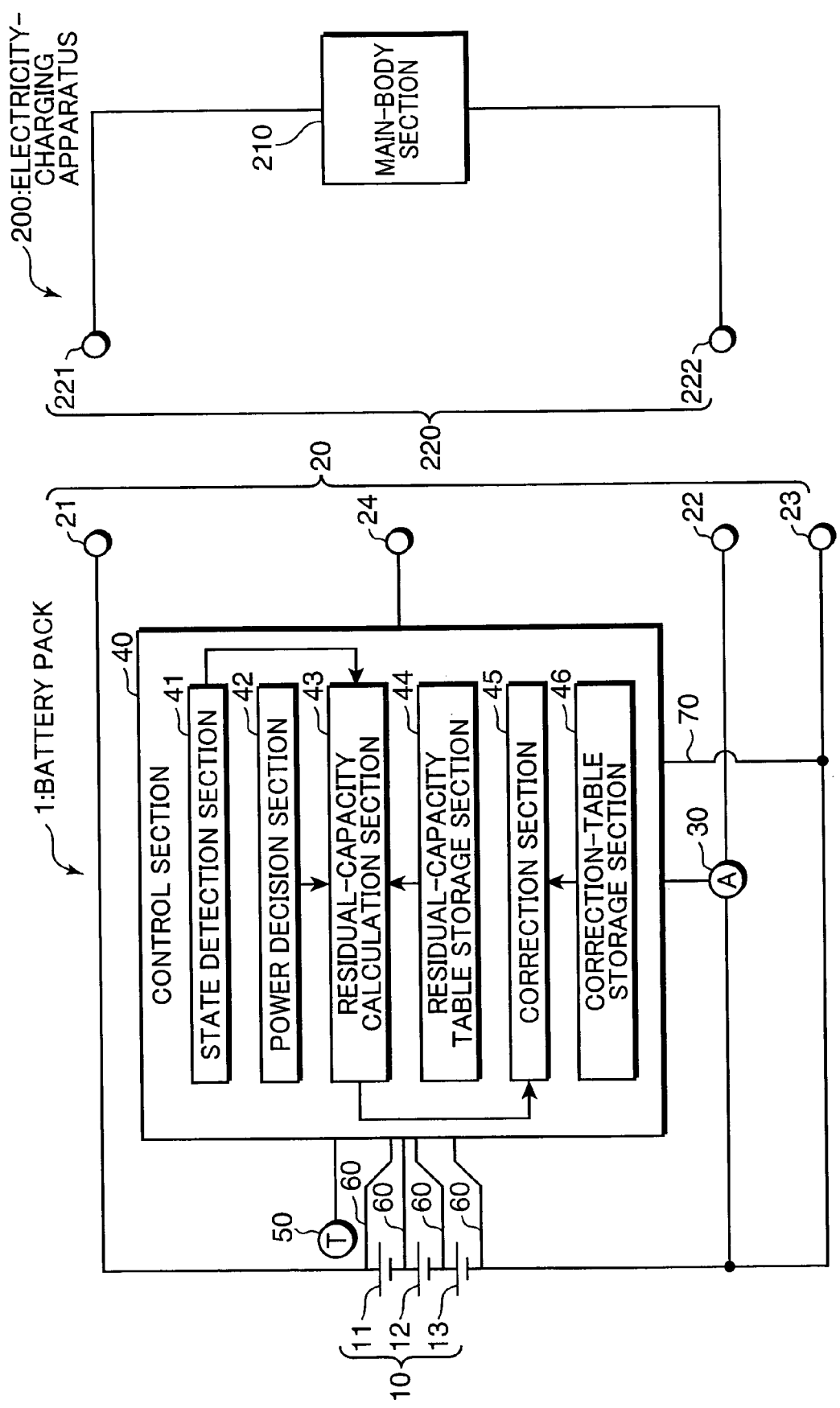
FIG. 2 is a block diagram, showing a battery pack according to a second embodiment of the present invention which is connected to an electricity-charging apparatus.

Hereinafter, a battery pack 1 according to a first embodiment of the present invention will be described with reference to the drawings. FIG. 1 and FIG. 2 illustrate block diagrams, showing the battery pack 1. To the battery pack 1, there is connected a load apparatus 100 shown in FIG. 1 or an electricity-charging apparatus 200 shown in FIG. 2. In this embodiment, as the load apparatus 100, there is used an electric tool such as an electric drill and an electric saw, a motor-attached bicycle, an electric wheelchair, or a motor-attached vehicle such as an electric vehicle.

As shown in FIG. 1 and FIG. 2, the battery pack 1 includes: a secondary-battery block 10; a terminal section 20; a current sensor 30; a control section 40; and a temperature sensor 50. The secondary-battery block 10 is made up of three secondary batteries 11 to 13 which are connected in series. Herein, as the secondary batteries 11 to 13, there is used a lithium-ion battery, a battery double-layer capacitor, or the like. Incidentally, the number of secondary batteries which make up the secondary-battery block 10 is not limited to three, and thus, it may also be one, two, four, or more.

The terminal section 20 includes: a plus terminal 21; a charging minus terminal 22; a discharging minus terminal 23; and a power detection terminal 24. The plus terminal 21 is connected to a plus terminal 131 of the load apparatus 100, or a plus terminal 221 of the electricity-charging apparatus 200.

To the discharging minus terminal 23, a minus terminal 133 of the load apparatus 100 is connected. A minus terminal 222 of the electricity-charging apparatus 200 is connected to the charging minus terminal 22. To the power detection terminal 24, a switch terminal 132 of the load apparatus 100 is connected, so that it receives a power notification signal which is outputted from the load apparatus 100 and outputs it to the control section 40.

The current sensor 30 is connected between the charging minus terminal 22 and the minus electrode of the secondary battery 13. Thereby, it detects an electric current which passes through the secondary batteries 11 to 13 and outputs, to the control section 40, a current detection signal which indicates the quantity of this electric current. In this embodiment, the residual capacity is calculated by the current accumulation method only when charged. At the time when they are charged, a large quantity of electric current is not sent to the secondary batteries 11 to 13. Such an electric current passes through them when discharged. Therefore, when charged, if the electric current is at such a level as passing through the secondary batteries 11 to 13, the current can be detected by a widely-used moderate-priced current sensor. Hence, as the current sensor 30, a popular inexpensive current sensor is applied.

The temperature sensor 50 detects the temperature of the secondary batteries 11 to 13 and outputs, to the control section 40, a temperature detection signal which indicates the degree of this temperature.

The control section 40 is formed by a CPU (or central processing unit), a ROM (read only memory), a RAM, and the like. It has the functions of: a state detection section 41; a power decision section 42; a residual-capacity calculation section 43; a residual-capacity table storage section 44; a correction section 45; and a correction-table storage section 46. These functions are realized by the CPU executing a control program stored in the ROM. To the control section 40, four voltage detection lines 60 are connected for detecting the voltage temperature of each secondary battery 11 to 13. Also, a detection line 70 is connected thereto for detecting whether or not an electric current is passing through the discharging minus terminal 23.

If the current sensor 30 has detected an electric current, the state detection section 41 decides that the secondary batteries 11 to 13 are in the electricity-charged state. In contrast, if an electric current has passed through the detection line 70, it decides that the secondary batteries 11 to 13 are in the electricity-discharging state. Hence, the state detection section 41 decides whether the secondary batteries 11 to 13 are in the electricity-charged state or in the electricity-discharging state.

If the power detection terminal 24 has received the power notification signal, the power decision section 42 decides that the secondary batteries 11 to 13 are in the power-on state. Unless the power detection terminal 24 has received the power notification signal, it decides that the secondary batteries 11 to 13 are in the power-off state.

If the state detection section 41 has decided that the secondary batteries 11 to 13 are in the electricity-charged state, then according to the current detection signal outputted from the current sensor 30, the residual-capacity calculation section 43 calculates the residual capacity of the secondary batteries 11 to 13 in the current accumulation method. In detail, the residual-capacity calculation section 43 receives the current detection signals which are outputted at predetermined time intervals from the current sensor 30. Then, it accumulates the current values indicated by these current detection signals to calculate the current quantity (Ah or coulomb) which has flowed into the secondary batteries 11 to 13. Next, it adds this current quantity to the residual capacity of the secondary batteries 11 to 13 at the beginning of the measurement by the current sensor 30. Thereby, it calculates the residual capacity of the secondary batteries 11 to 13.

Furthermore, if the state detection section 41 has decided that the secondary batteries 11 to 13 are in the electricity-discharging state and if the power decision section 42 has decided that the secondary batteries 11 to 13 are in the power-off state, then the residual-capacity calculation section 43 acquires each voltage of the secondary batteries 11 to 13 via the voltage detection lines 60. Then, it refers to the residual-capacity table storage section 44 and specifies the residual capacity which corresponds to each voltage. Thereby, it calculates the total residual capacity of the secondary batteries 11 to 13.

The residual-capacity table storage section 44 stores a residual-capacity table which indicates the relation between the voltage of each secondary battery 11 to 13 and the residual capacity thereof. In the residual-capacity table, the voltage values of the secondary batteries 11 to 13 and the residual-capacity value which corresponds to each voltage are related and stored. These residual-capacity values are obtained in advance in an experiment or the like. Herein, if the secondary batteries 11 to 13 have the same characteristics, the residual-capacity table storage section 44 may store a single kind of residual-capacity table. On the other hand, if the secondary batteries 11 to 13 have characteristics different from each other, it may store the residual-capacity table which corresponds to each of the secondary batteries 11 to 13.

The correction section 45 refers to the correction-table storage section 46 and specifies the correction factor which corresponds to the temperature indicated by the temperature detection signal outputted from the temperature sensor 50. Then, it multiplies the residual capacity calculated in the residual-capacity calculation section 43 by this correction factor. Thereby, it calculates the corrected residual capacity.

The correction-table storage section 46 stores a correction table which indicates the relation between the temperature of the secondary batteries 11 to 13 and the correction factor. In the correction table, the temperature of the secondary batteries 11 to 13 and the correction-factor value which corresponds to each temperature are related and stored. These correction-factor values are obtained beforehand in an experiment or the like.

Herein, if the secondary batteries 11 to 13 are each a secondary battery with the same characteristics, the correction-table storage section 46 may store a single kind of correction table. On the other hand, if the secondary batteries 11 to 13 are a secondary battery which has characteristics different from each other, it may store the correction table which corresponds to each of the secondary batteries 11 to 13.

The load apparatus 100 includes a load section 110, a power notification switch 120, and a terminal section 130. The load section 110 is formed by an electric motor or the like which converts the electrical energy supplied from the battery pack 1 into mechanical motion. Thus, it discharges electricity from the secondary batteries 11 to 13.

The power notification switch 120 is turned on when an operator makes an operation for driving the load section 110. On the other hand, it is turned off when the load section 110 is not driven. Specifically, if an electric tool is used as the load apparatus 100, the power notification switch 120 is turned on when an operator turns on an operation lever for driving the electric tool. Then, if a motor-attached bicycle is used as the load apparatus 100, the power notification switch 120 is turned on when the bicycle is pedaled. Next, if an electric wheelchair is used as the load apparatus 100, the power notification switch 120 is turned on when an operator turns on the electric wheel chair's operation lever. Then, if an electric vehicle is used as the load apparatus 100, the power notification switch 120 is turned on when an operator steps on its accelerator.

The terminal section 130 includes: a plus terminal 131; the switch terminal 132; and a minus terminal 133. When the power notification switch 120 is turned on, in order to drive the load section 110, the switch terminal 132 outputs, to the battery pack 1, a drive signal which is sent to the load section 110, as the power notification signal.

As shown in FIG. 2, the electricity-charging apparatus 200 includes a main-body section 210 and a terminal section 220. The main-body section 210 is formed by an inverter and like. Thus, it converts an AC voltage for home use into a DC voltage and outputs it to the battery pack 1, so that the secondary batteries 11 to 13 can be charged. The terminal section 220 includes the plus terminal 221 and the minus terminal 222.

In this embodiment, the voltage detection lines 60 and the residual-capacity calculation section 43 correspond to the voltage detecting means; the current sensor 30, to the current detecting means; the state detection section 41, to the state detecting means; the power detection terminal 24, to the receiving means; and the residual-capacity calculation section 43 and the residual-capacity table storage section 44, to the residual-capacity calculating means.

Figure 3:
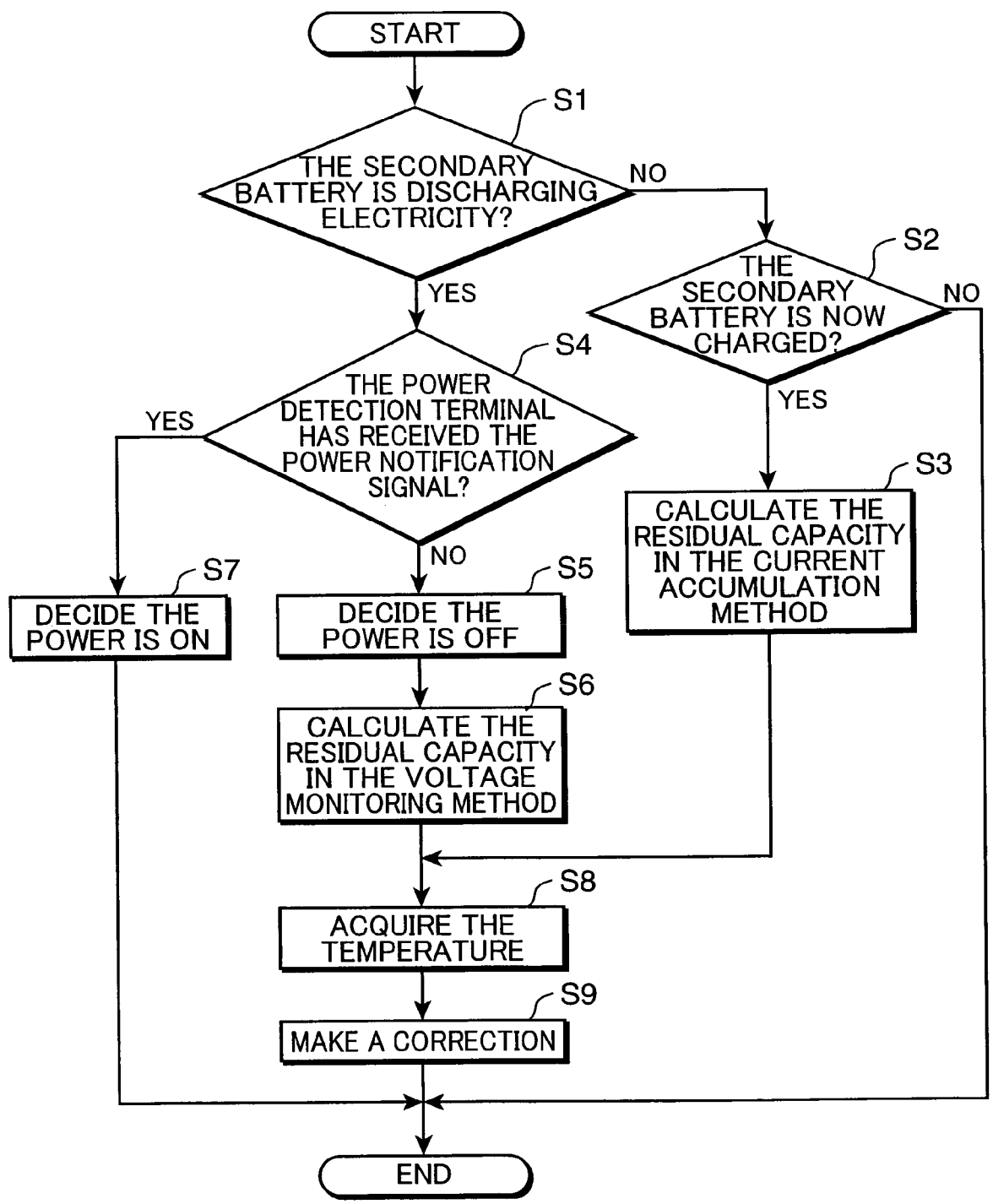
FIG. 3 is a flow chart, showing the operation of the battery pack.

Next, the operation of the battery pack 1 according to this embodiment will be described using the flow chart shown in FIG. 3. First, in a step S1, if the state detection section 41 has decided that the secondary batteries 11 to 13 are in an electricity-discharging state (YES in the step S1), the processing goes ahead to a step S4. In contrast, if it has decided that the secondary batteries 11 to 13 are in an electricity-charged state (NO in the step S1, YES in a step S2), the residual-capacity calculation section 43 accumulates the current value indicated by the current detection signal outputted from the current sensor 30. Then, it calculates the residual capacity of the secondary batteries 11 to 13 in the current accumulation method (in a step S3).

In the step S4, if the power detection terminal 24 has received the power notification signal (YES in the step S4), the power decision section 42 decides that the secondary batteries 11 to 13 is in the power-on state (in a step S7). Then, the processing is terminated. In this case, the residual-capacity calculation section 43 is not supposed to calculate the residual capacity.

On the other hand, in the step S4, unless the power detection terminal 24 has received the power notification signal (NO in the step S4), the power decision section 42 decides that the secondary batteries 11 to 13 is in the power-off state (in a step S5).

In a step S6, the residual-capacity calculation section 43 acquires each voltage of the secondary batteries 11 to 13. Then, it refers to the residual-capacity table storage section 44 and specifies the residual capacity which corresponds to each voltage of the secondary batteries 11 to 13. Thereby, it calculates the total residual capacity of the secondary batteries 11 to 13. In short, the residual capacity of the secondary batteries 11 to 13 is calculated in the voltage monitoring method.

In a step S8, the residual-capacity calculation section 43 acquires the temperature of the secondary batteries 11 to 13 detected by the temperature sensor 50. In a step S9, the residual-capacity calculation section 43 acquires the correction factor which corresponds to the temperature it has acquired. Then, it multiplies the residual capacity calculated in the step S3 or S6 by this correction factor. Thereby, the corrected residual capacity is calculated and the processing is completed. Herein, the load apparatus 100 or the electricity-charging apparatus 200 is notified of the calculated corrected residual capacity. Then, it is displayed in a display section (not shown) of the load apparatus 100 or a display section (not shown) of the electricity-charging apparatus 200.

As described above, in the battery pack 1 according to this embodiment, if the secondary batteries 11 to 13 are in an electricity-charged state, the residual capacity of the secondary batteries 11 to 13 is calculated in the current accumulation method. Therefore, the residual capacity of the secondary batteries 11 to 13 can be accurately calculated, without using a current sensor which is capable of detecting a large quantity of electric current with high precision. On the other hand, if the secondary batteries 11 to 13 are in an electricity-discharging state, then when the power is turned off, the residual capacity of the secondary batteries 11 to 13 is calculated in the voltage monitoring method. As a result, the residual capacity can be precisely calculated.

Incidentally, in the above described embodiment, an electric tool or the like is illustrated as the load apparatus 100. However, the present invention is not limited to this. A notebook personal computer, or mobile equipment such as a cellular phone, may also be used. Furthermore, in the above described embodiment, the charging minus terminal 22 and the discharging minus terminal 23 are two separate terminals. However, it is not limited to this, and thus, they may also be one and the same terminal. In that case, an operation switch may be provided which notifies the battery pack 1 which of the electricity-charging apparatus 200 and the load apparatus 100 is connected thereto.

Specifically, if the electricity-charging apparatus 200 is connected to the battery pack 1, this operation switch is brought down on the charging side by an operator. Then, a signal which indicates that the electricity-charging apparatus 200 is connected thereto is outputted to the control section 40. On the other hand, if the load apparatus 100 is connected to the battery pack 1, this operation switch is brought down on the discharging side by the operator. Then, a signal which indicates that the load apparatus 100 is connected thereto is outputted to the control section 40. On the basis of this signal, the state detection section 41 detects whether the battery pack 1 is in the electricity-charged state or in the electricity-discharging state.

Figure 4:
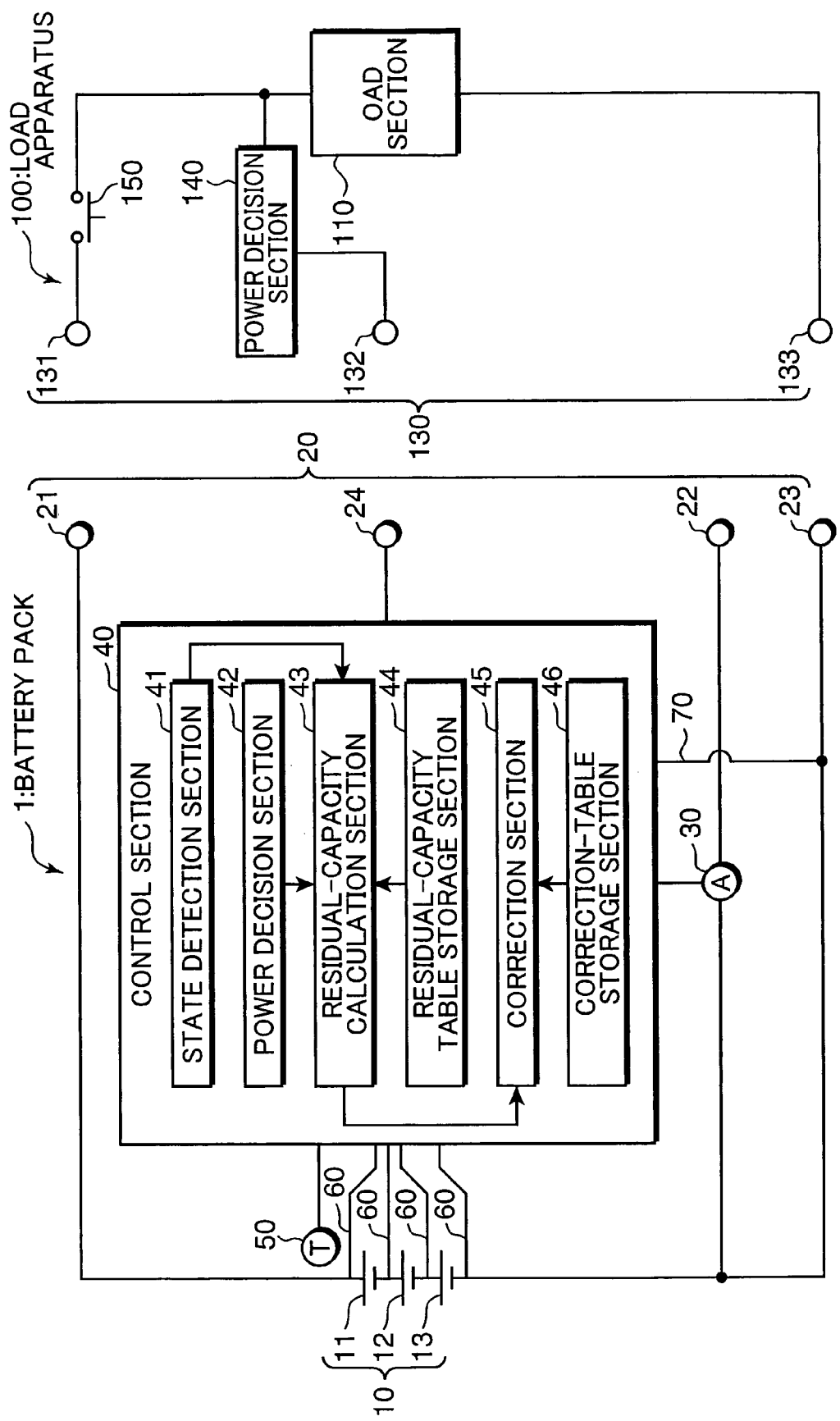
FIG. 4 is a block diagram, showing the battery pack and the load apparatus in which a power decision section is provided between a load section and a switch terminal.

In the above described embodiment, the load section 110 outputs a power signal when kept driven. However, the present invention is not limited to this. As shown in FIG. 4, a power decision section 140 may also be provided between the load section 110 and the switch terminal 132. In that case, the power notification signal is outputted to the battery pack 1 from the power decision section 140. In FIG. 4, the load section 110 is an electric tool including a trigger switch 150. The power decision section 140 is formed by a CPU, a comparator, and the like. When the trigger switch 150 is turned on, it receives an electric signal which flows through the load section 110. If this electric signal is greater than a certain value, it decides that the load section 110 is in the power-on state. Then, it generates a power notification signal for giving notice that it is in the power-on state, and outputs it to the battery pack 1. On the other hand, the power decision section 140 decides that it is in the power-off state, it generates a power notification signal which indicates that it is in the power-off state. Then, it outputs it to the battery pack 1. In this case, the power decision section 42 decodes the power notification signal, so that it can decide whether the load section 110 is in the power-on state or in the power-off state.

In the above described embodiment, the residual-capacity calculation section 43 refers to the residual-capacity table storage section 44 and calculates the residual capacity of the secondary batteries 11 to 13. However, the present invention is not limited to this. It may also store a function which expresses the relation between the voltage of the secondary batteries 11 to 13 and the residual capacity thereof. Then, it inputs, in this function, the voltage of the secondary batteries 11 to 13 which has been acquired via the voltage detection lines 60. Thereby, the residual capacity of the secondary batteries 11 to 13 can be calculated.

In the above described embodiment, the correction section 45 refers to the correction-table storage section 46 and corrects the residual capacity. However, it is not limited to this. The correction section 45 may also store a function which expresses the relation between the temperature and the correction factor, and input, in this function, the temperature of the secondary batteries 11 to 13 which has been detected by the temperature sensor 50. Thereby, the correction factor can be calculated. Furthermore, a function which expresses the relation between the residual capacity and the temperature, and the corrected residual capacity, may also be stored. In that case, the temperature detected by the temperature sensor 50 and the residual capacity calculated by the residual-capacity calculation section 43 are inputted in this function. Consequently, the corrected residual capacity can be calculated.

Moreover, in the above described embodiment, a first correction table and a second correction table are stored in the correction-table storage section 46. Herein, the first correction table is a table which is created in advance in an experiment or the like, taking into account the fact that the lower the temperature of a secondary battery becomes, the lower its discharge efficiency becomes. It stores the temperature of a secondary battery and the correction factor which corresponds to each temperature. On the other hand, the second correction table is a table which is created in beforehand in an experiment or the like, taking into account the fact that as the temperature of a secondary battery changes, its charge efficiency changes. It stores the temperature of a secondary battery and the correction factor which corresponds to each temperature.

Then, if the residual-capacity calculation section 43 calculates the residual capacity of the secondary batteries 11 to 13, using the voltage monitoring method, then the correction section 45 may also refer to the second correction table stored in the correction-table storage section 46 and specify the correction factor which corresponds to the temperature indicated by the temperature detection signal outputted from the temperature sensor 50. Then, it multiplies the residual capacity calculated in the residual-capacity calculation section 43, by the correction factor which it has specified. Thereby, it calculates the corrected residual capacity.

In addition, if the residual-capacity calculation section 43 calculates the residual capacity of the secondary batteries 11 to 13, using the current accumulation method, then the correction section 45 refers to the first correction table and specifies the correction factor which corresponds to the temperature indicated by the temperature detection signal outputted from the temperature sensor 50. Then, it multiplies the current value used for the calculation in the residual-capacity calculation section 43, by the correction factor which it has specified. Thereby, the corrected residual capacity can be calculated.

(Second Embodiment)

Figure 5:
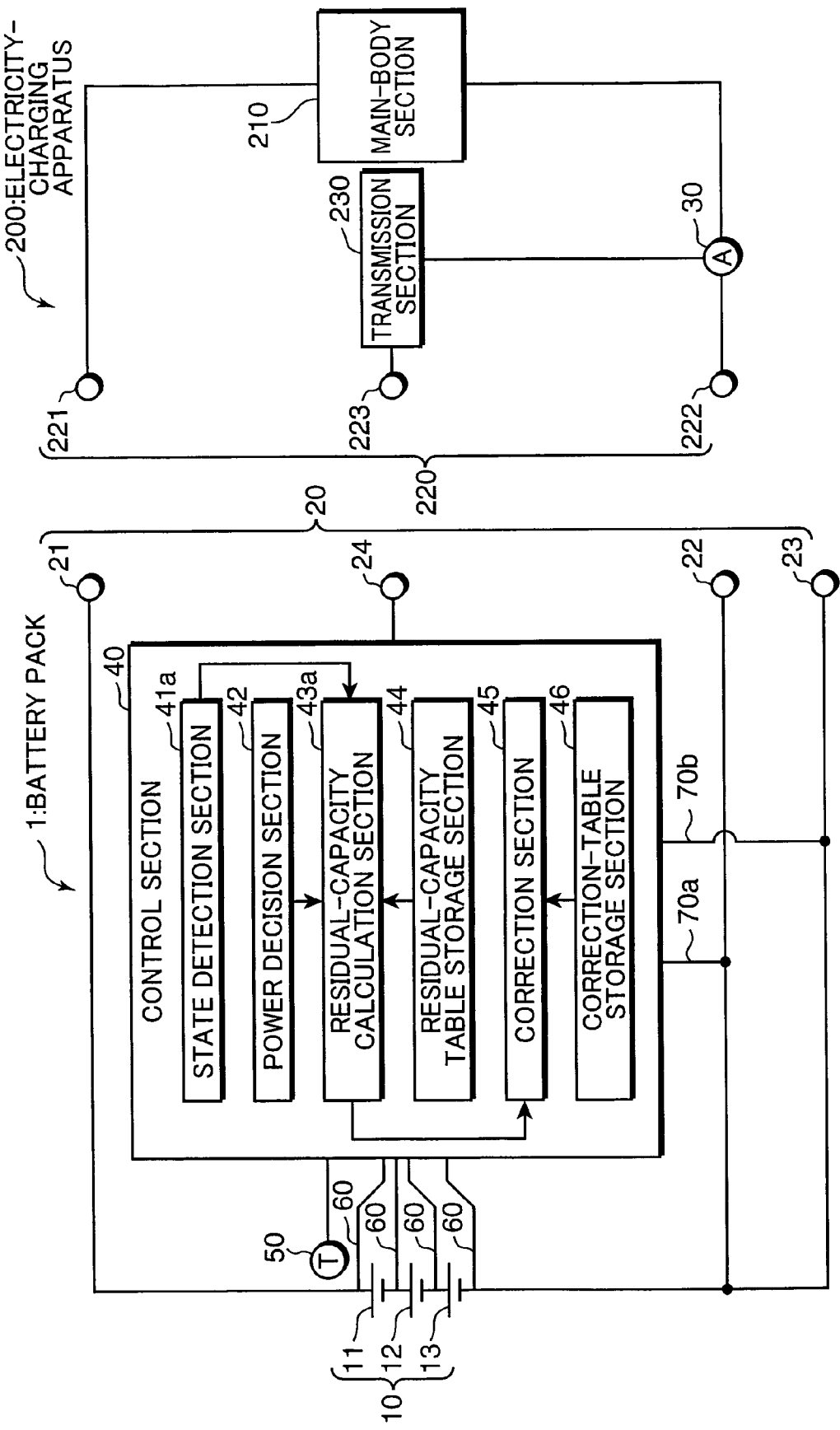
FIG. 5 is a block diagram, showing the battery pack according to the second embodiment.

Next, a battery pack 1 according to a second embodiment of the present invention will be described. Herein, in the second embodiment, component elements are given the same reference characters and numerals as those of the first embodiment, as long as the former are identical to the latter. Thus, their description is omitted. FIG. 5 is a block diagram, showing the configuration of the battery pack 1 according to the second embodiment.

In the battery pack 1 according to the second embodiment, a current sensor 30 is connected between the main-body section 210 of the electricity-charging apparatus 200 and the minus terminal 222. Besides, the electricity-charging apparatus 200 is provided with a transmission section 230.

The transmission section 230 generates a current notification signal which indicates the current value detected by the current sensor 30. Then, it transmits it at a predetermined time interval to the battery pack 1. Concretely, the transmission section 230 includes a terminal 223 for transmitting the current notification signal. Thus, if the battery pack 1 is connected to the electricity-charging apparatus 200, the power detection terminal 24 is connected to the terminal 223. Thereby, via the power detection terminal 24, the control section 40 can receives the current notification signal generated in the transmission section 230. Incidentally, the battery pack 1 may also be separately provided with a special-purpose terminal for receiving the current notification signal. In that case, the terminal 223 is connected to this separately-provided terminal, so that the control section 40 can receives the current notification signal through the separately-provided terminal.

If an electric current has passed through a detection line 70a, a state detection section 41a decides that the secondary batteries 11 to 13 are in the electricity-charged state. In contrast, if an electric current has flowed through a detection line 70b, it decides that the secondary batteries 11 to 13 are in the electricity-discharging state. Hence, a decision can be made whether the secondary batteries 11 to 13 are in the electricity-charged state or in the electricity-discharging state.

If the state detection section 41a has decided that the secondary batteries 11 to 13 are in the electricity-charged state, then according to the current notification signal transmitted from the transmission section 230, a residual-capacity calculation section 43a calculates the residual capacity of the secondary batteries 11 to 13 in the current accumulation method. In detail, the residual-capacity calculation section 43a receives the current notification signal transmitted at the predetermined time interval from the transmission section 230. Then, it accumulates the current value indicated by the current notification signal which it has received. Thereby, it calculates the residual capacity of the secondary batteries 11 to 13.

Furthermore, if the state detection section 41a has decided that the secondary batteries 11 to 13 are in the electricity-discharging state and if the power decision section 42 has decided that the secondary batteries 11 to 13 are in the power-off state, then the residual-capacity calculation section 43a acquires each voltage of the secondary batteries 11 to 13 via the voltage detection lines 60. Then, it refers to the residual-capacity table storage section 44 and specifies the residual capacity which corresponds to each voltage. Thereby, it calculates the total residual capacity of the secondary batteries 11 to 13.

Herein, in the second embodiment, the current sensor 30 corresponds to the current detecting means; the transmission section 230 and the terminal 223, to the transmitting means; the voltage detection lines 60 and the residual-capacity calculation section 43a, to the voltage detecting means; the state detection section 41a, to the state detecting means; the power detection terminal 24, to the receiving means; the residual-capacity calculation section 43a and the residual-capacity table storage section 44, to the residual-capacity calculating means; and the correction section 45 and the correction-table storage section 46, to the correcting means.

In this way, in the battery pack 1 according to the second embodiment, the current sensor 30 is provided on the side of the electricity-charging apparatus 200. This helps lower costs for the battery pack 1. Besides, in the electricity-charged state, the electric current which passes through the secondary batteries 11 to 13 is accumulated so that the residual capacity of the secondary batteries 11 to 13 can be calculated. On the other hand, if the secondary batteries 11 to 13 are in the electricity-discharging state, the residual capacity of the secondary batteries 11 to 13 can be calculated based on the voltage of the secondary batteries 11 to 13 in the power-off state.

Herein, in general, a secondary battery is charged using an electric current at a relatively low level. Hence, there is no need to use a current sensor which can detect a high-level electric current. The electricity-charging apparatus 200 can be formed by an inexpensive current sensor which can detect the electric current that passes through the secondary battery when charged, or an electric current at such a level. This helps reduce costs for the electricity-charging apparatus 200.

On the other hand, at the time of a discharge, the residual capacity is calculated based on the voltage when the power is turned off. In other words, when the variation in the load is large with the power turned on, the residual capacity is not supposed to be calculated. This makes it possible to calculate the residual capacity precisely.

(Summary of the Present Invention)

(1) A battery pack according to the present invention, comprising: a secondary battery; a voltage detecting means for detecting the voltage of the secondary battery; a current detecting means for detecting an electric current which passes through the secondary battery; a state detecting means for detecting whether the secondary battery is in an electricity-charged state or an electricity-discharging state; a receiving means for receiving, from a load apparatus which is connected to the battery pack, a power notification signal for notifying the battery pack whether the power is turned on or off; and a residual-capacity calculating means for, if the secondary battery is detected being in an electricity-charged state by the state detecting means, then calculating the residual capacity of the secondary battery by accumulating the electric current which is detected by the current detecting means, and if the secondary battery is detected being in an electricity-discharging state by the state detecting means, then calculating the residual capacity of the secondary battery based on the voltage which is detected by the voltage detecting means when the power notification signal indicates that the power is turned off.

According to this configuration, in an electricity-charged state, an electric current which passes through the secondary battery is accumulate so that the residual capacity of the secondary battery is calculated. If the secondary battery is in an electricity-charged state, when the power is kept off, the residual capacity of the secondary battery is calculated based on the voltage of the secondary battery. Herein, in general, a secondary battery is charged using an electric current at a relatively low level. Hence, there is no need to use a current sensor which can detect a high-level electric current. The battery pack can be formed by an inexpensive current sensor which can detect the electric current that passes through the secondary battery when charged, or an electric current at such a level. This helps cut down costs for the battery pack. On the other hand, at the time of a discharge, the residual capacity is calculated based on the voltage when the power is turned off. In other words, when the variation in the load is large with the power turned on, the residual capacity is not supposed to be calculated. This makes it possible to calculate the residual capacity precisely.

(2) Furthermore, preferably, the battery pack according to the above described configuration should further comprise: a temperature detecting means for detecting the temperature of the secondary battery; and a correcting means for correcting the residual capacity of the secondary battery which is calculated by the residual-capacity calculating means based on the temperature which is detected by the temperature detecting means.

According to this configuration, the temperature of the secondary battery is detected, and based on the detected temperature, the residual capacity of the secondary battery is corrected. This makes it possible to calculate the residual capacity of the secondary battery more precisely.

(3) Moreover, it is preferable that, in the battery pack according to the above described configuration, the correcting means: include a first correction table which indicates the relation between the temperature of the secondary battery and the correction factor of the residual capacity which is created in advance, taking into account the fact that the lower the temperature of the secondary battery becomes, the lower the discharge efficiency of the secondary battery becomes; and correct the residual capacity of the secondary battery which is calculated based on the voltage by the residual-capacity calculating means with reference to the first correction table.

According to this configuration, the residual capacity of the secondary battery calculated using the voltage monitoring method is corrected in consideration of the fact that a fall in the temperature of the secondary battery lowers its discharge efficiency. This makes it possible to calculate the residual capacity of the secondary battery more accurately.

(4) In addition, it is preferable that, in the battery pack according to the above described configuration, the correcting means: include a second correction table which indicates the relation between the temperature of the secondary battery and the correction factor of the residual capacity which is created in advance, taking into account the fact that as the temperature of the secondary battery changes, the charge efficiency of the secondary battery changes; and correct the residual capacity of the secondary battery which is calculated based on the electric current by the residual-capacity calculating means with reference to the second correction table.

According to this configuration, the residual capacity of the secondary battery calculated using the current accumulation method is corrected in consideration of the fact that a variation in the temperature of the secondary battery changes its charge efficiency. This makes it possible to calculate the residual capacity of the secondary battery more precisely.

(5) Furthermore, it is preferable that, in the battery pack according to the above described configuration: the secondary battery be formed by a plurality of secondary batteries; the voltage detecting means detect the voltage of each secondary battery; and if the secondary battery is detected being in an electricity-charged state, the residual-capacity calculating means calculate the residual capacity of the secondary battery by accumulating the electric current which is detected by the current detecting means, and if the secondary battery is detected being in an electricity-discharging state, the residual-capacity calculating means calculate the residual capacity of the secondary battery based on the voltage which is detected by the voltage detecting means when the power notification signal indicates that the power is turned off.

According to this configuration, even if the secondary batteries are connected in series and have a large capacity, its residual capacity can be precisely detected.

(6) Moreover, preferably, in the battery pack according to the above described configuration, the residual-capacity calculating means: should calculate the residual capacity of each secondary battery based on the voltage of each secondary battery which is detected by the voltage detecting means; and further, should calculate the residual capacity of the whole secondary battery based on this residual capacity of each secondary battery.

According to this configuration, the residual capacity of each secondary battery is calculated, and based on this residual capacity, the residual capacity of the entire secondary battery is calculated. This makes it possible to detect the residual capacity accurately.

(7) In addition, it is preferable that, in the battery pack according to the above described configuration, the residual-capacity calculating means: include a residual-capacity table which indicates the relation between the voltage and the residual capacity of the secondary battery; and calculate the residual capacity which corresponds to the voltage which is detected by the voltage detecting means with reference to the residual-capacity table.

According to this configuration, the residual capacity of the secondary battery is calculated, using the residual-capacity table in which the relation between the voltage and the residual capacity is stored beforehand. Therefore, the residual capacity can be calculated at high speed and with precision.

(8) Furthermore, it is preferable that, in the battery pack according to the above described configuration: the load apparatus be an electric motor; and the receiving means receive, as the power notification signal, a drive signal which is sent when the electric motor is driven.

According to this configuration, a drive signal which flows when the electric motor is driven is received as the power notification signal, so that whether the power is kept on or off is detected. Therefore, whether the power is kept on or off can be detected without separately providing a means for generating the power notification signal in the electric motor.

(9) A battery pack according to the present invention which is connected to an electricity-charging apparatus that charges a secondary battery or a load apparatus that discharges the secondary battery, wherein: the electricity-charging apparatus includes a current detecting means for detecting an electric current which passes through the secondary battery, and a transmitting means for transmitting, to the battery pack, the value of the electric current which is detected by the current detecting means; and the battery pack includes a voltage detecting means for detecting the voltage of the secondary battery, a state detecting means for detecting whether the secondary battery is in an electricity-charged state or an electricity-discharging state, a receiving means for receiving, from the load apparatus, a power notification signal for notifying the battery pack whether the power is turned on or off, and a residual-capacity calculating means for, if the secondary battery is detected being in an electricity-charged state by the state detecting means, then calculating the residual capacity of the secondary battery by accumulating the value of the electric current which is transmitted by the transmitting means, and if the secondary battery is detected being in an electricity-discharging state by the state detecting means, then calculating the residual capacity of the secondary battery based on the voltage which is detected by the voltage detecting means when the power notification signal indicates that the power is turned off.

According to this configuration, the electricity-charging apparatus includes a current detecting means for detecting an electric current which passes through the secondary battery, and a transmitting means for transmitting the detected current value to the battery pack. Then, in the electricity-charged state, the current value transmitted from the current transmitting means is accumulated, and the residual capacity of the secondary battery is calculated in the current accumulation method. On the other hand, if the secondary battery is in the electricity-discharging state, when the power is kept off, the residual capacity of the secondary battery is calculated in the voltage monitoring method. Hence, there is no need to provide a current detecting means in the battery pack, thus helping cut down costs for the battery pack.

In addition, in general, a secondary battery is charged using an electric current at a relatively low level. Hence, there is no need to use a current sensor which can detect a high-level electric current. An electricity-charging apparatus can be formed by an inexpensive current sensor which can detect the electric current that passes through the secondary battery when charged, or an electric current at such a level. This also helps cut down costs for an electricity-charging apparatus. On the other hand, at the time of a discharge, the residual capacity is calculated based on the voltage when the power is turned off. In other words, when the variation in the load is large with the power turned on, the residual capacity is not supposed to be calculated. This makes it possible to calculate the residual capacity precisely.

This application is based on Japanese patent application serial No. 2004-359988, filed in Japan Patent Office on Dec. 13, 2004, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A battery pack which is configured to be connected to an electricity-charging apparatus that charges the battery pack or a load apparatus that discharges the battery pack, comprising:
    a secondary battery having a battery plus terminal and a battery minus terminal;
    a battery pack plus terminal configured to connect to a plus terminal of a load apparatus and a plus terminal of an electricity-charging apparatus;
    a discharging minus terminal, through which a discharging current of the secondary battery flows, configured to directly connect a minus terminal of the load apparatus;
    a charging minus terminal, through which a charging current of the secondary battery flows, configured to connect a minus terminal of the electricity-charging apparatus, the charging minus terminal being provided independently of the discharging minus terminal;
    a voltage detecting means for detecting the voltage of the secondary battery;
    a current detecting means for detecting an electric current which flows in the secondary battery, said current detecting means being provided between the battery minus terminal and the charging minus terminal;
    a detection line for detecting if a current flows in the discharging minus terminal, said detection line being provided between the battery minus terminal and the discharging minus terminal;
    a state detecting means for detecting whether the secondary battery is in an electricity-charging state in which the electricity-charging apparatus and the battery pack are connected to each other or in an electricity-discharging state in which the load apparatus and the battery pack are connected to each other;
    a receiving means for receiving, from the load apparatus, a power notification signal for deciding whether the secondary battery is in a power-on state or a power-off state;
    a power deciding means for deciding that the secondary battery is in the power-on state when the receiving means has received the power notification signal, and that the secondary battery is in the power-off state when the receiving means has not received the power notification signal; and
    a residual-capacity calculating means for, in response to the state detecting means detecting that the secondary battery is in the electricity-charging state, calculating the residual capacity of the secondary battery by accumulating the electric current which is detected by the current detecting means, and in response to the state detecting means detecting that the secondary battery is in the electricity-discharging state, and the power deciding means deciding that the secondary battery is in the power-off state, calculating the residual capacity of the secondary battery based on the voltage which is detected by the voltage detecting means, the residual capacity being calculated by accumulating the electric current only when the secondary battery is in the electricity-charging state, and the residual capacity being calculated based on the voltage only when the secondary battery is in the electricity-discharging state and in the power-off state, wherein:
    the power notification signal transmitted from the load apparatus is indicative of a driving signal which flows in the load apparatus,
    said state detecting means decides that the secondary battery is in the electricity-charging state when the current detecting means detects the electric current, and that the secondary battery is in the electricity-discharging state when the detection line detects the current,
    the discharging minus terminal is configured to be directly connected to the battery minus terminal of the secondary battery,
    the charging current is smaller than the discharging current, and
    said current detecting means includes an electric current sensor configured to detect an electric current which flows in the secondary battery in the electricity-charging state.

2. The battery pack according to claim 1, further comprising:
    a temperature detecting means for detecting the temperature of the secondary battery; and
    a correcting means for correcting the residual capacity of the secondary battery which is calculated by the residual-capacity calculating means based on the temperature which is detected by the temperature detecting means.

3. The battery pack according to claim 2, wherein the correcting means:
    includes a first correction table which indicates the relation between the temperature of the secondary battery and the correction factor of the residual capacity which is created in advance, taking into account the fact that the lower the temperature of the secondary battery becomes, the lower the discharge efficiency of the secondary battery becomes; and corrects the residual capacity of the secondary battery which is calculated based on the voltage by the residual-capacity calculating means with reference to the first correction table.

4. The battery pack according to claim 2, wherein the correcting means:
    includes a second correction table which indicates the relation between the temperature of the secondary battery and the correction factor of the residual capacity which is created in advance, taking into account the fact that as the temperature of the secondary battery changes, the charge efficiency of the secondary battery changes; and corrects the residual capacity of the secondary battery which is calculated based on the electric current by the residual-capacity calculating means with reference to the second correction table.

5. The battery pack according to claim 1, wherein:
the secondary battery is formed by a plurality of secondary batteries;
the voltage detecting means detects the voltage of each secondary battery; and
if the secondary battery is detected being in the electricity-charging state, the residual-capacity calculating means calculates the residual capacity of the secondary battery by accumulating the electric current which is detected by the current detecting means, and
if the secondary battery is detected being in the electricity-discharging state, and if the power deciding means has decided that the secondary battery is in the power-off state, the residual-capacity calculating means calculates the residual capacity of the secondary battery based on the voltage which is detected by the voltage detecting means.

6. The battery pack according to claim 5, wherein the residual-capacity calculating means: calculates the residual capacity of each secondary battery based on the voltage of each secondary battery which is detected by the voltage detecting means; and further, calculates the residual capacity of the whole secondary battery based on this residual capacity of each secondary battery.

7. The battery pack according to claim 1, wherein the residual-capacity calculating means: includes a residual-capacity table which indicates the relation between the voltage and the residual capacity of the secondary battery; and calculates the residual capacity which corresponds to the voltage which is detected by the voltage detecting means with reference to the residual-capacity table.

8. The battery pack according to claim 1, wherein:
the load apparatus is an electric motor; and
the receiving means receives, as the power notification signal, a drive signal which is sent when the electric motor is driven.

9. The battery pack according to claim 1, wherein the residual-capacity calculating means calculates the residual capacity of the secondary battery only by accumulating the electric current which is detected by the current detecting means if the secondary battery is detected being in the electricity-charging state by the state detecting means, and calculates the residual capacity of the secondary battery only based on the voltage which is detected by the voltage detecting means if the secondary battery is detected being in an electricity-discharging state by the state detecting means and the power deciding means has decided that the secondary battery is in the power-off state.

10. A battery pack which is configured to be connected to an electricity-charging apparatus that charges a secondary battery or a load apparatus that discharges the secondary battery, wherein:
the electricity-charging apparatus includes a current detecting means for detecting an electric current which passes through the secondary battery, and a transmitting means for transmitting, to the battery pack, a value of the electric current which is detected by the current detecting means; and
said battery pack comprises:
a battery pack plus terminal configured to connect to a plus terminal of a load apparatus and a plus terminal of an electricity-charging apparatus;
a discharging minus terminal, through which a discharging current of the secondary battery flows, configured to directly connect a minus terminal of the load apparatus;
a charging minus terminal, through which a charging current of the secondary battery flows, configured to connect a minus terminal of the electricity-charging apparatus, the charging minus terminal being provided independently of the discharge minus terminal;
a voltage detecting means for detecting the voltage of the secondary battery;
a state detecting means for detecting whether the secondary battery is in an electricity-charging state in which the electricity-charging apparatus and the battery pack are connected to each other or in an electricity-discharging state in which the load apparatus and the battery pack are connected to each other;
a receiving means for receiving, from the load apparatus, a power notification signal for deciding whether the secondary battery is in a power-on state or a power-off state;
a power deciding means for deciding that the secondary battery is in the power-on state when the receiving means has received the power notification signal, and that the secondary battery is in the power-off state when the receiving means has not received the power notification signal;
a residual-capacity calculating means for, in response to the state detecting means detecting that the secondary battery is in the electricity-charging state, calculating the residual capacity of the secondary battery by accumulating the value of the electric current which is transmitted by the transmitting means, and in response to the state detecting means detecting the secondary battery is in the electricity-discharging state, and the power deciding means deciding that the secondary battery is in the power-off state, calculating the residual capacity of the secondary battery based on the voltage which is detected by the voltage detecting means, the residual capacity being calculated by accumulating the electric current only when the secondary battery is in the electricity-charging state, and the residual capacity being calculated based on the voltage only when the secondary battery is in the electricity-discharging state and in the power-off state;
a first detection line for detecting current flow in the charging minus terminal; and
a second detection line for detecting current flow in the discharging minus terminal, wherein:
the power notification signal transmitted from the load apparatus is indicative of a driving signal which flows in the load apparatus,
said state detecting means decides that the secondary battery is in the electricity-charging state when the electric current flows in the first detection line, and that the secondary battery is in the electricity-discharging state when the electric current flows in the second detection line,
the discharging minus terminal and the charging minus terminal are configured to be directly connected to the battery minus terminal of the secondary battery,
the charging current is smaller than the discharging current and said current detecting means includes an electric current sensor configured to detect an electric current which flows in the secondary battery in the electricity-charging state.

11. The battery pack according to claim 10, wherein the residual-capacity calculating means calculates the residual capacity of the secondary battery only by accumulating the electric current which is detected by the current detecting means if the secondary battery is detected being in the electricity-charging state by the state detecting means, and calculates the residual capacity of the secondary battery only based on the voltage which is detected by the voltage detecting means if the secondary battery is detected being in an electricity-discharging state by the state detecting means and the power deciding means has decided that the secondary battery is in the power-off state.

* * * * *